United States Patent
Rozenbaum et al.

(10) Patent No.: US 11,757,865 B2
(45) Date of Patent: Sep. 12, 2023

(54) RULE-BASED FILTERING FOR SECURING PASSWORD LOGIN

(71) Applicant: International Business Machines Corporation, Armonk, NY (US)

(72) Inventors: Nir Rozenbaum, Yoqneam Illit (IL); Nili Guy, Haifa (IL)

(73) Assignee: International Business Machines Corporations, Armonk, NY (US)

( * ) Notice: Subject to any disclaimer, the term of this patent is extended or adjusted under 35 U.S.C. 154(b) by 257 days.

(21) Appl. No.: 17/078,149

(22) Filed: Oct. 23, 2020

(65) Prior Publication Data
US 2022/0131849 A1    Apr. 28, 2022

(51) Int. Cl.
  *H04L 29/06*    (2006.01)
  *H04L 9/40*    (2022.01)

(52) U.S. Cl.
  CPC .................... *H04L 63/083* (2013.01)

(58) Field of Classification Search
  CPC ...... H04L 63/083; H04L 63/102; G06F 21/31
  USPC .............................................................. 726/7
  See application file for complete search history.

(56) References Cited

U.S. PATENT DOCUMENTS

| | | | |
|---|---|---|---|
| 9,030,293 B1 | 5/2015 | Tabak | |
| 10,402,550 B2* | 9/2019 | Uchida | G06F 3/04886 |
| 2011/0314294 A1* | 12/2011 | McGrew | G06F 21/31 |
| | | | 713/182 |
| 2013/0333007 A1 | 12/2013 | Chougle | |
| 2017/0185806 A1* | 6/2017 | Kong | G06F 21/45 |
| 2017/0255936 A1 | 9/2017 | Paya | |
| 2019/0080060 A1 | 3/2019 | Lee | |
| 2019/0332749 A1 | 10/2019 | Giatilis | |
| 2020/0134166 A1 | 4/2020 | Hassan | |
| 2021/0157900 A1* | 5/2021 | Sethi | G06F 21/46 |

FOREIGN PATENT DOCUMENTS

| | | |
|---|---|---|
| EP | 2184696 A1 | 5/2010 |
| JP | 2002229959 A | 8/2002 |
| JP | 2012133717 A | 7/2012 |
| JP | 2015007941 A | 1/2015 |
| WO | 2008080228 A1 | 7/2008 |

OTHER PUBLICATIONS

Reasoning Analytically about Password-Cracking Software, Liu et al, May 2019 (Year: 2019).*
"Combined Search and Examination Report", Application No. GB2114078.5, Filing Date: Oct. 1, 2021, Date of Report: dated Mar. 1, 2022, 8 pages.
Wikipedia, "Shoulder surfing (computer security)", Wikipedia, Accessed on Sep. 24, 2020, 6 Pages.

(Continued)

*Primary Examiner* — Jahangir Kabir
(74) *Attorney, Agent, or Firm* — Stephanie L. Carusillo (57) ABSTRACT

In an approach for a rule-based filtering system for securing password logins, a processor receives a password input on a user device. A processor determines whether the password requires filtering. Responsive to determining the password requires filtering, a processor filters characters from the password based on a set of filtering rules to create a filtered password. A processor determines whether the filtered password matches a stored password.

20 Claims, 4 Drawing Sheets

(56) References Cited

OTHER PUBLICATIONS

Zaheer et al., "One-Tip Secure: Next-Gen of Text-Based Password", Information and Communication Technology for Competitive Strategies, Lecture Notes in Networks and Systems, vol. 40, Springer, Singapore, pp. 235-243, Aug. 31, 2018, 9 Pages.

"Reply to UK Patent Application No. 2114078.5", dated Oct. 20, 2022, 12 pages.

\* cited by examiner

RULE-BASED FILTERING FOR SECURING PASSWORD LOGIN

BACKGROUND OF THE INVENTION

The present invention relates generally to the field of password authentication, and more particularly to rule-based filtering for securing password logins.

When it comes to protecting information, passwords are the most-used form of authentication for websites and applications alike. Upon registration, users create a unique identification (ID) and key (typically a username and password) that are then stored securely locally on the device, e.g., a mobile phone, or on the website's server. Ideally, the user is the only person with knowledge of their password, making it so that they're the only one able to access the account. When the user re-enters their credentials, they are checked against those stored and, if they are a match, the user is verified.

SUMMARY

Aspects of an embodiment of the present invention disclose a method, computer program product, and computer system for rule-based filtering for securing password logins. A processor receives a password input on a user device. A processor determines whether the password requires filtering. Responsive to determining the password requires filtering, a processor filters characters from the password based on a set of filtering rules to create a filtered password. A processor determines whether the filtered password matches a stored password.

In some aspects of an embodiment of the present invention, a processor determining whether the password requires filtering by counting a number of characters in the password; comparing the number of characters in the password to a second number of characters in the stored password; and responsive to determining there are more characters in the password than in the stored password, determining that the password requires filtering.

In some aspects of an embodiment of the present invention, the set of filtering rules includes at least one rule in the form of a regular expression.

In some aspects of an embodiment of the present invention, responsive to determining that the filtered password matches the stored password, a processor enables a user of the user device to log-in.

In some aspects of an embodiment of the present invention, responsive to a user of the user device opting-in to the rule-based filtering system, a processor requests the user to input the set of filtering rules. A processor receives the set of filtering rules from the user device. A processor stores the set of filtering rules in a user profile for the user.

In some aspects of an embodiment of the present invention, one rule of the set of filtering rules is a regular expression that defines a specific character to be filtered out of the password.

In some aspects of an embodiment of the present invention, one rule of the set of filtering rules is a regular expression that defines a mathematical rule that when a sequential set of characters add up to a pre-defined sum the sequential set of characters are filtered out of the password.

DETAILED DESCRIPTION

Embodiments of the present invention recognize that many people have to authenticate themselves using a password in various situations, e.g., while unlocking a phone, a door, a laptop, an application on a smart phone; when using an ATM; etc. Password authentication is considered one of the weaker methods for authentication with shoulder surfing attacks being one of many known issues. A shoulder surfing attack occurs when password login is done in a public place and involves a stranger literally peering over a user's shoulder in order to obtain the user's password to gain access to the user's sensitive data. Since most users use short and easy passwords, the stranger can easily remember the password. It is common knowledge that the longer the password is, the stronger the password gets. More specifically, the longer the password is, the harder the password is to reproduce even if a stranger shoulder surfed a user inputting their password.

Embodiments of the present invention recognize the need to utilize this common knowledge but take it a step further with additional parameters to reduce the risk that a stranger can remember a user's password after shoulder surfing, and thus increases password authentication security in general. Embodiments of the present invention provide a rule-based filtering mechanism that allows adding dummy characters, which are not taken into consideration in the authentication process, while a user enters a password. Based on configuration rules, the user would be able to add as many dummy characters as they want, and thus the user is able to conceal the real password. Embodiments of the present invention provide a program that filters dummy characters out of a received password based on pre-configured filtering rules.

As used herein, the term "real password" refers to the password the user has set as their password during setup for various situations, e.g., setup for a smart phone unlock password, a smart door keypad combination, a laptop unlock password, an application on a smart phone password, an ATM pin, etc. As used herein, the term "dummy password" refers to the password input by the user during the login component, in which the dummy password includes "dummy" characters intermixed into the real password that are just used as a stand in to throw off any shoulder surfers. As used herein, the term "filtered password" refers to the password after a password filtering program has applied a set of filtering rules to the password input by the user during a login component, in which characters have been removed from the original password input during login to leave a filtered password to be compared against the real password and enable log-in.

Implementation of embodiments of the invention may take a variety of forms, and exemplary implementation details are discussed subsequently with reference to the Figures.

Figure 1:
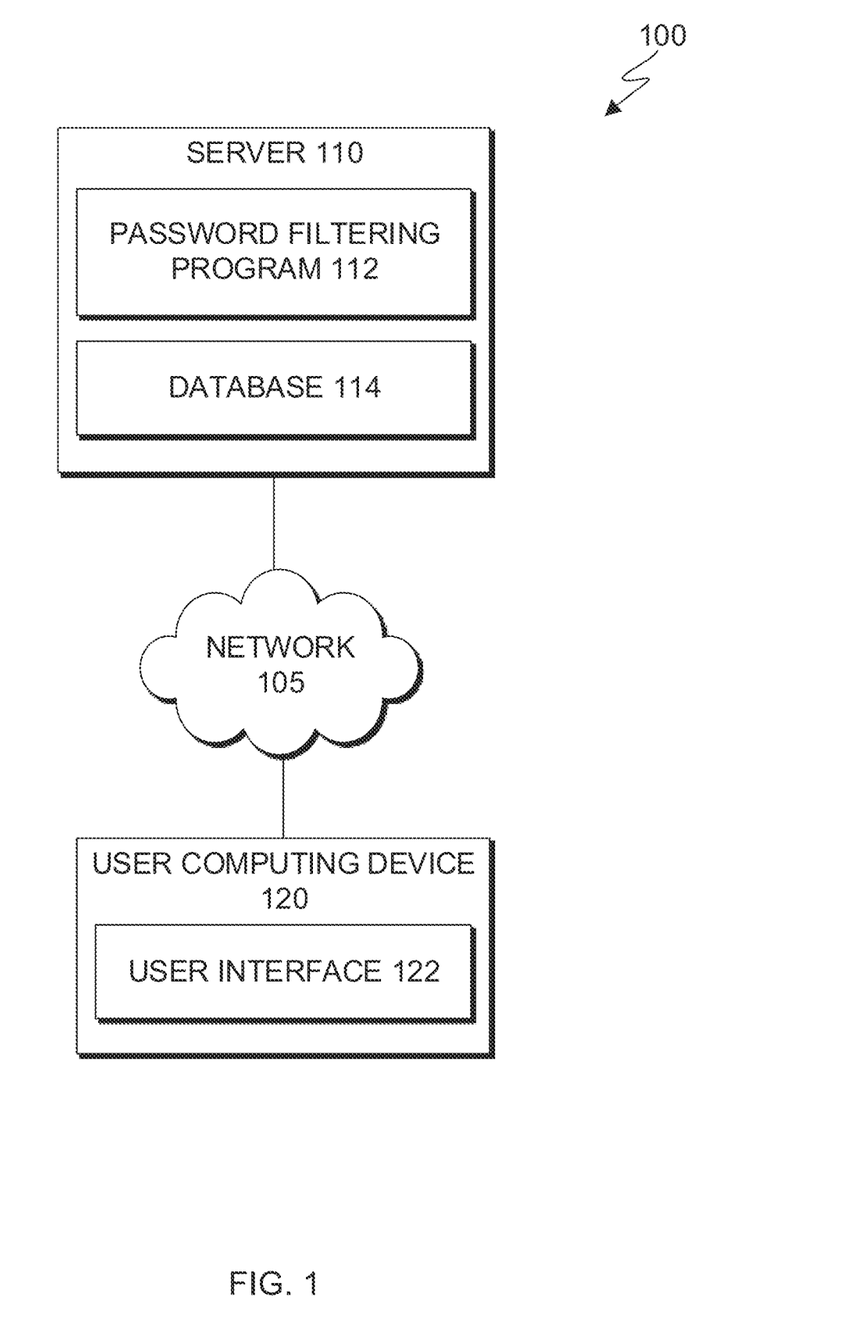
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and user computing device 120 interconnected over network 105. In some embodiments (not shown), the components of server 110 and user computing device 120 are run on the same device such that there is only, e.g., user computing device 120 in those embodiments. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, user computing device 120, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with user computing device 120 and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes password filtering program 112 and database 114. Server 110 may include internal and external hardware components, as depicted and described in further detail with respect to FIG. 4.

Password filtering program 112 operates to perform rule-based filtering for securing password logins. In the depicted embodiment, password filtering program 112 is a standalone program. In another embodiment password filtering program 112 may be integrated into another software product, such as a password authentication engine. In an embodiment, users opt-in to the use of password filtering program 112 and complete a configuration component with password filtering program 112 to establish a set of filtering rules and/or to set a real password. The configuration component of password filtering program 112 is depicted and described in further detail with respect to FIG. 2. The main, login component of password filtering program 112, performing rule-based filtering based on the set of filtering rules established during the configuration function for securing password logins, is depicted and described in further detail with respect to FIG. 3.

Database 114 operates as a repository for data received, used, and/or output by password filtering program 112. Data received, used, and/or generated may include, but is not limited to, real passwords stored by a user; dummy passwords input by a user; a set of filtering rules to be applied during the login function; filtered passwords generated after a set of filtering rules are applied to the dummy password; and any other data received, used, and/or output by password filtering program 112. Database 114 can be implemented with any type of storage device capable of storing data and configuration files that can be accessed and utilized by server 110, such as a hard disk drive, a database server, or a flash memory. In an embodiment, database 114 is accessed by password filtering program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that password filtering program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Password filtering program 112 enables the authorized and secure processing of personal data.

Password filtering program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Password filtering program 112 provides information regarding personal and/or confidential company data and the nature (e.g., type, scope, purpose, duration, etc.) of the processing. Password filtering program 112 provides the user with copies of stored personal and/or confidential company data. Password filtering program 112 allows the correction or completion of incorrect or incomplete personal and/or confidential company data. Password filtering program 112 allows for the immediate deletion of personal and/or confidential company data.

User computing device 120 operates as a computing device associated with a user that can opt-in to password filtering program 112 through a user interface, e.g., user interface 122. It is to be understood that user computing device 120 is representative of users that have opted-in to program filtering program 112 and, in other embodiments, distributed data processing environment 100 may include any number of user computing devices that have opted-in. In the depicted embodiment, user computing device 120 includes an instance of user interface 122. In an embodiment, user computing device 120 can be a laptop computer, a tablet computer, a smart phone, a smart watch, a smart speaker, smart glasses, wearable computer, or any programmable electronic device capable of communicating with various components and devices within distributed data processing environment 100, via network 105. In general, user computing device 120 represent one or more programmable electronic devices or combination of programmable electronic devices capable of executing machine readable program instructions and communicating with other computing devices (not shown) within distributed data processing environment 100 via a network, such as network 105. User computing device 120 may include internal and external hardware components, as depicted and described in further detail with respect to FIG. 4.

User interface 122 provides an interface between password filtering program 112 on server 110 and a user of user computing device 120. In one embodiment, user interface 122 is a mobile application software. Mobile application software, or an "app," is a computer program designed to run on smart phones, tablet computers and other mobile devices. In one embodiment, user interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 enables a user of user computing device 120 to set a real password, establish a set of filtering rules, and input a dummy password to be filtered based on the set of filtering rules. Further, user interface 122 enables a user of user computing device 120 to opt-in or opt-out of password filtering program 112.

Figure 2:
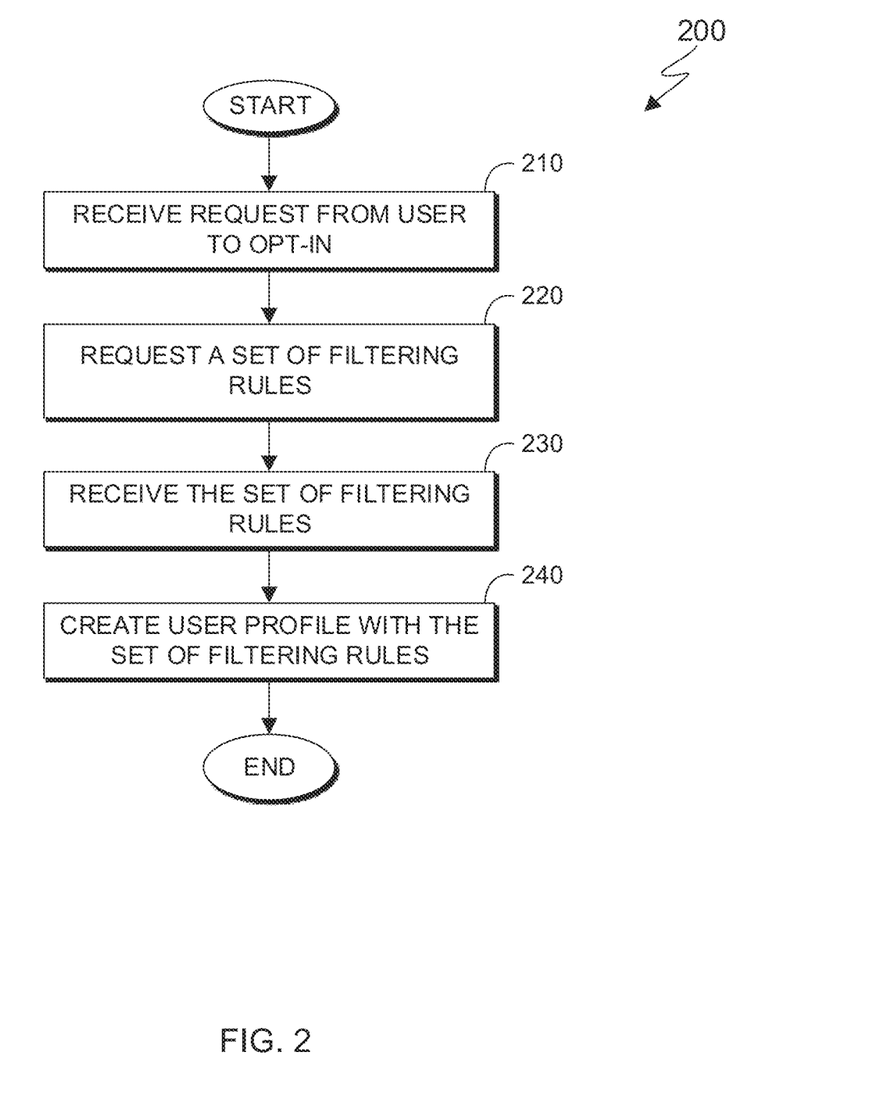
FIG. 2 is a flowchart depicting operational steps of a configuration component of a password filtering program, for configuring a set of filtering rules for the password filtering program, in accordance with an embodiment of the present invention.

FIG. 2 is a flowchart 200 depicting operational steps of a configuration component of password filtering program 112, on server 110 within distributed data processing environment 100 of FIG. 1, in accordance with an embodiment of the present invention. In an embodiment, password filtering program 112 receives a request from a user to opt-in, requests the user to input a set of filtering rules, receives the set of filtering rules, and creates a user profile for the user with the set of filtering rules. It should be appreciated that the process depicted in FIG. 2 illustrates one possible iteration of password filtering program 112, which may be repeated for each user that opts-in to password filtering program 112.

In step 210, password filtering program 112 receives a request from a user to opt-in. In an embodiment, password filtering program 112 receives a request from a user to opt-in to password filtering program 112. For example, a user of user computing device 120 sends a request to opt-in to password filtering program 112 through user interface 122 of user computing device 120.

In step 220, password filtering program 112 requests a set of filtering rules from the user. In an embodiment, password filtering program 112 requests information from the user. In an embodiment, responsive to password filtering program 112 receiving the request from the user to opt-in, password filtering program 112 requests a set of filtering rules from the user. In general, if a filtering rule matches or would modify the real password incorrectly, that filtering rule is invalid and will be rejected by password filtering program 112.

The set of filtering rules requested from the user can include generalized rules in the form of a regular expression. A regular expression is a sequence of characters that define a search pattern that has a specific syntax. The search pattern is then used by string-searching algorithms for "find" or "find and replace" operations on strings of characters. In other words, regular expressions are the specific, standard textual syntax for representing patterns for matching text. The set of filtering rules as regular expressions can be customized and generalized as much as the user wants, since regular expressions allow expressing any possible match pattern. For example, password filtering program 112 receives a rule from the user of the regular expression (?=^ABC)(?=EFG$) that will match strings of characters that start with ABC and end with EFG. In another example, password filtering program 112 receives a rule from the user of the regular expression a(bc){2,5} that will match strings of characters that have "a" followed by two up to five copies of the sequence "bc".

The set of filtering rules requested from the user can further include a regular expression rule that defines a sequential set of characters to be removed, in which the sequential set of characters can appear one or more times in a received password, and in which this rule has a defined starting character that is different from all characters in the real password and a defined ending character. For example, if the real password if "HelloWorld" and the rule filters out a sequential set of characters beginning with "t" and ending with "z", when a user inputs a dummy password "HeltenfkcozloWtqwezorld", the sequential set "tenfkoz" and "tqwez" will be filtered out.

The set of filtering rules requested from the user can further include a regular expression rule that defines a specific character to always be filtered out. For example, a user can define that the character "z" is always filtered out of a dummy password input by the user.

The set of filtering rules requested from the user can further include a regular expression mathematical rule that is applied to a sequence of characters, i.e., a user can define a mathematical rule that if sequential set of characters add up to a certain sum, then that sequential set of characters can be filtered out from the dummy password. For example, password filtering program 112 receives a rule from the user that if a sequence of three numbers sum up to 20, then that sequence of three numbers will be filtered out from any input dummy password.

In step 230, password filtering program 112 receives the set of filtering rules. In an embodiment, password filtering program 112 receives the set of filtering rules from the user including one or more of the rules described above. In an embodiment, responsive to password filtering program 112 requesting the set of filtering rules from the user, password filtering program 112 receives the set of filtering rules from the user.

In step 240, password filtering program 112 creates a user profile based on the set of filtering rules. In an embodiment, password filtering program 112 creates a user profile for the user and includes the set of filtering rules received from the user. In an embodiment, password filtering program stores the user profile and/or the set of filtering rules in a database, e.g., database 114. In an embodiment, responsive to password filtering program 112 receiving the set of filtering rules from the user, password filtering program 112 creates the user profile for the user and includes the set of filtering rules received from the user. This user profile is used by password filtering program 112 to recall and apply the set of filtering rules to a password input by the user on a user computing device, e.g., user computing device 120.

Figure 3:
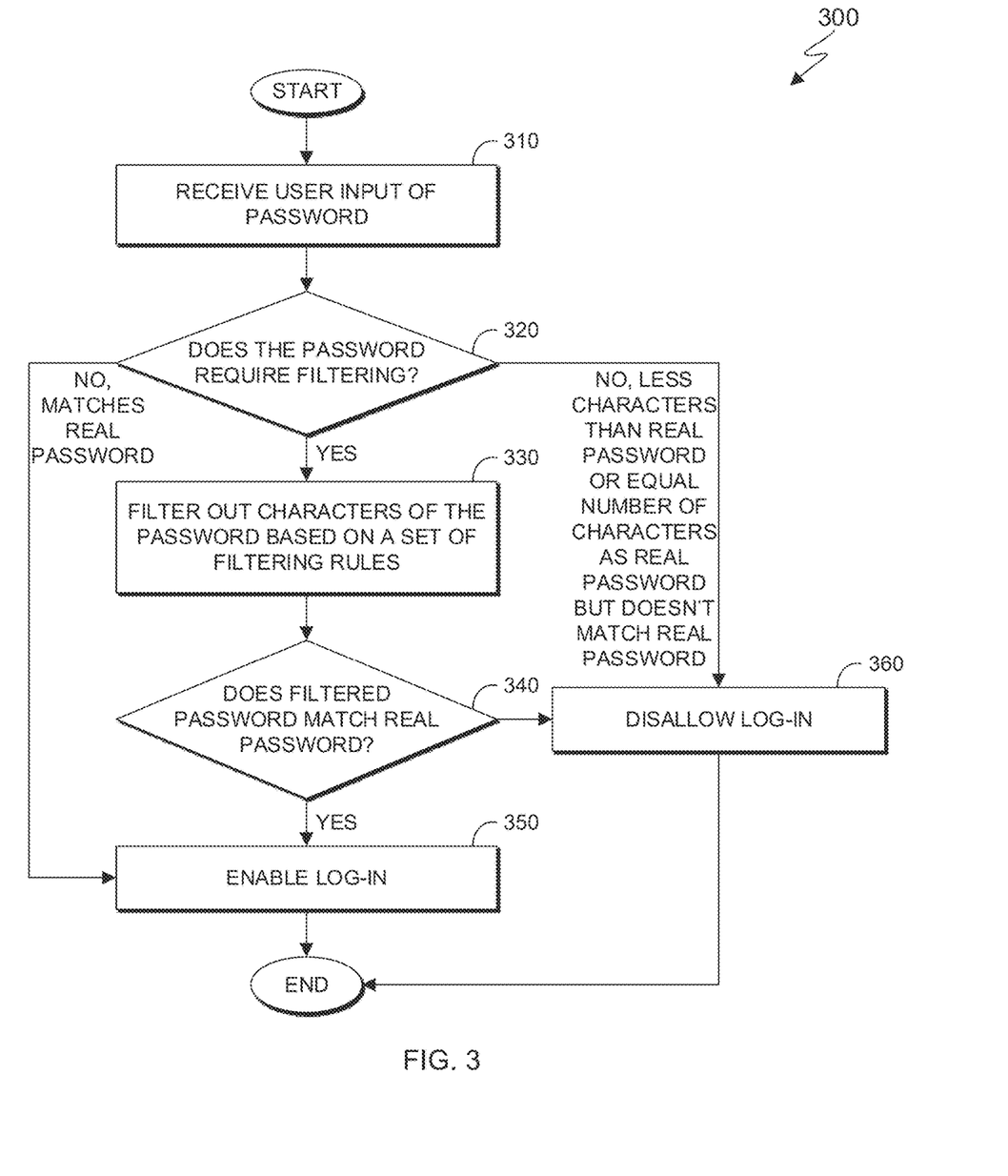
FIG. 3 is a flowchart depicting operational steps of a login component of the password filtering program, for performing rule-based filtering to secure password logins, in accordance with an embodiment of the present invention.

FIG. 3 is a flowchart 300 depicting operational steps of a login component of password filtering program 112, on server 110 within distributed data processing environment 100 of FIG. 1, in accordance with an embodiment of the present invention. In an embodiment, password filtering program 112 receives a password input by a user, determines whether the password requires filtering, responsive to determining the password does require filtering, filters characters from the password based on the set of filtering rules from the user profile, and determines whether the filtered password matches a real password. It should be appreciated that the process depicted in FIG. 3 illustrates one possible iteration of password filtering program 112, which may be repeated for each password input by the user that opted-in to password filtering program 112.

In step 310, password filtering program 112 receives a password input by a user. In an embodiment, password filtering program 112 receives a dummy password input by a user as a password for a log-in. For example, password filtering program 112 receives the password "Cliftngfdgzon-Panozrk" input by a user through user interface 122 of user computing device 120.

In decision 320, password filtering program 112 determines whether the password requires filtering. Essentially, password filtering program 112 determines whether the user input a dummy password, the real password, or an incorrect password. In an embodiment, password filtering program 112 determines the password requires filtering based on the password having more characters than the real password. In an embodiment, responsive to password filtering program 112 receiving the password input by the user, password filtering program 112 determines whether the password requires filtering. In an embodiment, password filtering program 112 determines the password does not require filtering if the password matches the real password, if the password has less characters than the real password, or if the password has an equal number of characters as the real password but does not match the real password.

If password filtering program 112 determines the password does not require filtering because the password matches the real password (decision 320, "NO, MATCHES REAL PASSWORD" branch), password filtering program 112 proceeds to step 350 enabling log-in. If password filtering program 112 determines the password does not require filtering because the password has less characters than the real password or the password has an equal number of characters as the real password but does not match the real password (decision 320, "NO, LESS CHARACTERS THAN REAL PASSWORD OR EQUAL NUMBER OF CHARACTERS AS REAL PASSWORD BUT DOESN'T MATCH REAL PASSWORD" branch), password filtering program 112 proceeds to step 360 disallowing log-in. If password filtering program 112 determines the password does require filtering because the password has more characters than the real password (decision 320, "YES" branch), password filtering program 112 proceeds to step 330 to filter out characters based on a set of filtering rules.

In step 330, password filtering program 112 filters out characters of the password based on a set of filtering rules. In an embodiment, password filtering program 112 filters out characters of the dummy password based on the set of filtering rules stored in the user profile of the user. For example, password filtering program 112 retrieves the set of filtering rules from the user profile for the user stored in database 114 and applies each rule of the set of filtering rules to the password and filters out characters based on the set of filtering rules. In an embodiment, responsive to password filtering program 112 determining the password requires filtering, password filtering program 112 filters out characters of the password based on the set of filtering rules.

In decision 340, password filtering program 112 determines whether the filtered password matches the real password. In an embodiment, password filtering program 112 compares the filtered password to the real password to determine whether the filtered password matches the real password. If password filtering program 112 determines the filtered password does not match the real password (decision 340, NO branch), password filtering program 112 proceeds to step 360 disallowing log-in. In step 360, password filtering program 112 disallows log-in. In some embodiments, password filtering program 112 notifies the user that the password is incorrect and requests the user to re-enter a password. If password filtering program 112 determines the filtered password does match the real password (decision 340, YES branch), password filtering program 112 proceeds to step 350 enabling log-in. In step 350, password filtering program 112 enables the user to log-in.

Figure 4:
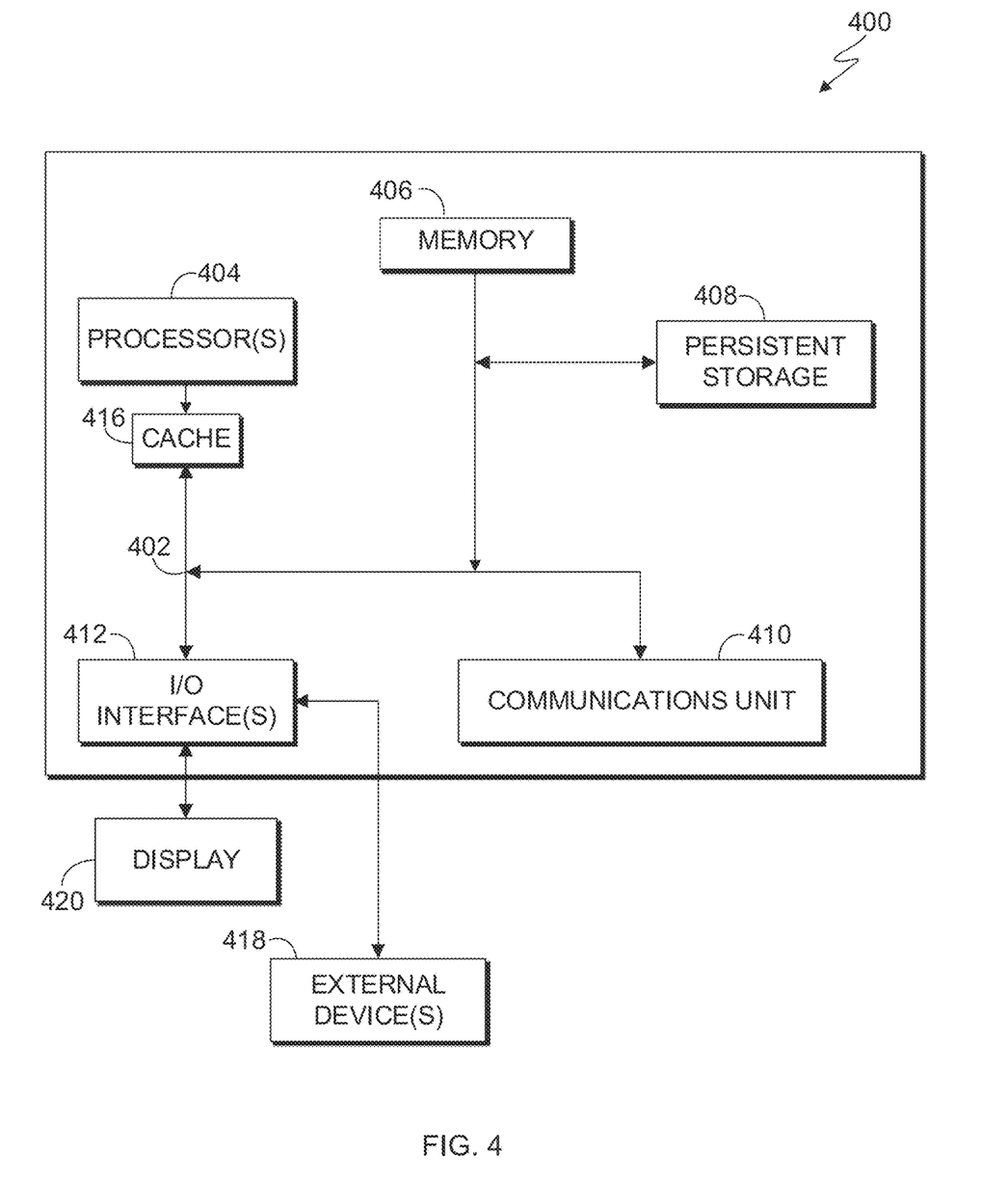
FIG. 4 depicts a block diagram of components of a computing device of the distributed data processing environment of FIG. 1, in accordance with an embodiment of the present invention.

FIG. 4 depicts a block diagram of components of computing device 400, suitable for server 110 and/or user computing device 120 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs may be downloaded to persistent storage 408 through communications unit 410.

I/O interface(s) 412 allows for input and output of data with other devices that may be connected to server 110 and user computing device 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for a rule-based filtering system for securing password logins, the computer-implemented method comprising:
   receiving, by one or more processors, a password input on a user device;
   determining, by the one or more processors, whether the password requires filtering;
   responsive to determining the password requires filtering, filtering, by the one or more processors, characters from the password based on a set of filtering rules stored in a user profile of a user associated with the user device to create a filtered password, wherein the set of filtering rules comprises a first rule in a form of a first regular expression that defines a sequential set of characters to be removed with a defined starting character and a defined ending character that are different from all characters of the stored password and a second rule in the form of a second regular expression that defines a mathematical rule of when a sequence of characters adds up to a defined sum the sequence of characters is to be removed; and
   determining, by the one or more processors, whether the filtered password matches a stored password.

2. The computer-implemented method of claim 1, wherein determining whether the password requires filtering further comprises:
   counting, by the one or more processors, a number of characters in the password;
   comparing, by the one or more processors, the number of characters in the password to a second number of characters in the stored password; and
   responsive to determining there are more characters in the password than in the stored password, determining, by the one or more processors, that the password requires filtering.

3. The computer-implemented method of claim 1, wherein the set of filtering rules includes at least one regular expression.

4. The computer-implemented method of claim 1, further comprising:
   responsive to determining that the filtered password matches the stored password, enabling, by the one or more processors, a user of the user device to log-in.

5. The computer-implemented method of claim 1, further comprising:
   responsive to a user of the user device opting-in to the rule-based filtering system, requesting, by the one or more processors, the user to input the set of filtering rules;
   receiving, by the one or more processors, the set of filtering rules from the user device; and
   storing, by the one or more processors, the set of filtering rules in a user profile for the user.

6. The computer-implemented method of claim 1, wherein one rule of the set of filtering rules defines a specific character to be filtered out of the password.

7. The computer-implemented method of claim 1, wherein the mathematical rule is that when the defined sequential of characters add up to a pre-defined sum the defined sequential of characters are filtered out of the password.

8. A computer program product for a rule-based filtering system for securing password logins, the computer program product comprising:
   one or more computer readable storage device and program instructions collectively stored on the one or more computer readable storage device, the stored program instructions comprising:
   program instructions to receive a password input on a user device;
   program instructions to determine whether the password requires filtering;
   responsive to determining the password requires filtering, program instructions to filter characters from the password based on a set of filtering rules stored in a user profile of a user associated with the user device to create a filtered password, wherein the set of filtering rules comprises a first rule in a form of a first regular expression that defines a sequential set of characters to be removed with a defined starting character and a defined ending character that are different from all characters of the stored password and a second rule in the form of a second regular expression that defines a mathematical rule of when a sequence of characters adds up to a defined sum the sequence of characters is to be removed; and
   program instructions to determine whether the filtered password matches a stored password.

9. The computer program product of claim 8, wherein the program instructions to determine whether the password requires filtering further comprise:
   program instructions to count a number of characters in the password;

program instructions to compare the number of characters in the password to a second number of characters in the stored password; and responsive to determining there are more characters in the password than in the stored password, program instructions to determine that the password requires filtering.

10. The computer program product of claim 8, wherein the set of filtering rules includes at least one regular expression.

11. The computer program product of claim 8, further comprising:

responsive to determining that the filtered password matches the stored password, program instructions to enable a user of the user device to log-in.

12. The computer program product of claim 8, further comprising:

responsive to a user of the user device opting-in to the rule-based filtering system, program instructions to request the user to input the set of filtering rules;

program instructions to receive the set of filtering rules from the user device; and program instructions to store the set of filtering rules in a user profile for the user.

13. The computer program product of claim 8, wherein one rule of the set of filtering rules defines a specific character to be filtered out of the password.

14. The computer program product of claim 8, wherein the mathematical rule is that when the defined sequential of characters add up to a pre-defined sum the defined sequential of characters are filtered out of the password.

15. A computer system for a rule-based filtering system for securing password logins, the computer system comprising:

one or more computer processors;

one or more computer readable storage media;

program instructions collectively stored on the one or more computer readable storage media for execution by at least one of the one or more computer processors, the stored program instructions comprising:

program instructions to receive a password input on a user device;

program instructions to determine whether the password requires filtering;

responsive to determining the password requires filtering, program instructions to filter characters from the password based on a set of filtering rules stored in a user profile of a user associated with the user device to create a filtered password, wherein the set of filtering rules comprises a first rule in a form of a first regular expression that defines a sequential set of characters to be removed with a defined starting character and a defined ending character that are different from all characters of the stored password and a second rule in the form of a second regular expression that defines a mathematical rule of when a sequence of characters adds up to a defined sum the sequence of characters is to be removed; and program instructions to determine whether the filtered password matches a stored password.

16. The computer system of claim 8, wherein the program instructions to determine whether the password requires filtering further comprise:

program instructions to count a number of characters in the password;

program instructions to compare the number of characters in the password to a second number of characters in the stored password; and responsive to determining there are more characters in the password than in the stored password, program instructions to determine that the password requires filtering.

17. The computer system of claim 8, wherein the set of filtering rules includes at least one regular expression.

18. The computer system of claim 8, further comprising:

responsive to determining that the filtered password matches the stored password, program instructions to enable a user of the user device to log-in.

19. The computer system of claim 8, further comprising:

responsive to a user of the user device opting-in to the rule-based filtering system, program instructions to request the user to input the set of filtering rules;

program instructions to receive the set of filtering rules from the user device; and program instructions to store the set of filtering rules in a user profile for the user.

20. The computer system of claim 8, wherein one rule of the set of filtering rules defines a specific character to be filtered out of the password.

* * * * *